United States Patent [19]  
Doi

[11] Patent Number: 4,900,910  
[45] Date of Patent: Feb. 13, 1990

[54] SYSTEM FOR DETECTING THE POSITION OF AN OBJECTIVE LENS

[75] Inventor: Akihiko Doi, Tokyo, Japan

[73] Assignee: Kabushiki Kaisha Toshiba, Kawasaki, Japan

[21] Appl. No.: 259,399

[22] Filed: Oct. 18, 1988

Related U.S. Application Data

[63] Continuation of Ser. No. 933,997, Nov. 24, 1986, abandoned.

[30] Foreign Application Priority Data

Nov. 28, 1985 [JP] Japan ................................ 60-267660  
Dec. 16, 1985 [JP] Japan ................................ 60-282502  
Jun. 23, 1986 [JP] Japan ................................ 61-146544  
Jun. 23, 1986 [JP] Japan ................................ 61-146545

[51] Int. Cl.⁴ ............................................. G01J 1/20  
[52] U.S. Cl. ..................................... 250/201; 369/45  
[58] Field of Search ................. 250/201 DF, 201 AF; 362/44–46

[56] References Cited

U.S. PATENT DOCUMENTS

| | | | |
|---|---|---|---|
| 4,425,043 | 1/1984 | van Rosmalen | 369/45 |
| 4,561,081 | 12/1985 | Janssen et al. | 369/45 |
| 4,614,863 | 9/1986 | Sato | 250/201 |
| 4,634,853 | 1/1987 | Kanamaru | 250/201 |
| 4,641,020 | 2/1987 | Iwai | 250/201 |

Primary Examiner—David C. Nelms  
Assistant Examiner—Khaled Shami  
Attorney, Agent, or Firm—Finnegan, Henderson, Farabow, Garrett and Dunner

[57] ABSTRACT

In a system for detecting the position of an objective lens which is movably suspended and can be moved along a predetermined direction, a mirror is fixed to the objective lens and is moved with the objective lens along the predetermined directions. A fixed base is so arranged to face the mirror and light emitting element and photodetectors are arranged along the predetermined direction or the fixed base. Cylindrical light shielding member is located between the photodetectors and the element and a differential amplifier is connected to the photodetectors.

14 Claims, 7 Drawing Sheets

SYSTEM FOR DETECTING THE POSITION OF AN OBJECTIVE LENS

This application is a continuation, of application Ser. No. 933,997, filed Nov. 24, 1986, now abandoned.

BACKGROUND OF THE INVENTION

The present invention relates to a system for detecting the position of an objective lens, and more specifically to a system in which light rays, emitted from a light emitting element, are directed toward a mirror fixed to the objective lens, and light sensing elements sense the reflected rays from the mirror, thereby detecting the position of the lens.

Information recording/retrieving apparatuses have recently been developed for improvement. These apparatuses are designed so that information is recorded on or retrieved from an optical disk, optical card, or other information recording medium (hereinafter referred to simply as optical disk), by means of a light beam. In these apparatuses, the light beam must be focused accurately on the optical disk so that tracking guides, formed on the optical disk, can be traced accurately by the beam. To attain this, the conventional information recording/retrieving apparatuses is provided with a focusing servo unit for detecting a focusing state and keeping an objective lens always in the focusing state, and a tracking servo unit for detecting a tracking guide and directing the lens toward the guide at all times. Conventionally, the focusing state has been detected by the astigmatic method using an astigmatic lens, the critical-angle method using a total-reflection prism, or the knife-edge method utilizing a knife edge. In these methods, the astigmatic lens, prism, or knife edge is disposed in the optical path of the light beam, reflected from the optical disk, and the beam, transmitted through the lens or the like, is delivered to a photodetector for focus detection. According to a method of track detection, moreover, a diffraction image of the tracking guide is detected. Also in this method, the light beam reflected by the optical disk is led to a detector for detecting the diffraction image.

Thus, according to these focus and track detection methods, the focus and track are detected by means of the light beam, reflected from the optical disk. Therefore, if the optical disk has any scratches or dust thereon, or if it vibrates from any causes, error signals may possibly be generated from a photodetector for focus and track detection, thus moving the objective lens in an unexpected direction, and sometimes even causing it to run against the optical disk. In response to the error signals, moreover, the objective lens may be directed toward an undesired tracking guide, or it may take too much time to redirect the lens toward a desired tracking guide. In some cases, oscillation may be caused in a servo loop, thus inducing the objective lens to vibrate.

SUMMARY OF THE INVENTION

The object of the present invention is to provide a system capable of detecting the position of an objective lens with high sensitivity.

According to the present invention, there is provided a system for detecting the position of an objective lens comprising: an optical axis; means for suspending the objective lens so that the lens is movable along a predetermined direction; means for driving the objective lens; a mirror movable with the objective lens; a fixed base opposed to the mirror; light emitting means fixed to the base so as to face the mirror, whereby light rays are emitted toward the mirror; and first and second photodetectors for detecting the light rays reflected from the mirror, and converting the rays into electrical signals, the photodetectors being arranged along the predetermined direction and fixed to the base.

DETAILED DESCRIPTION OF THE PREFERRED EMBODIMENTS

Figure 1:
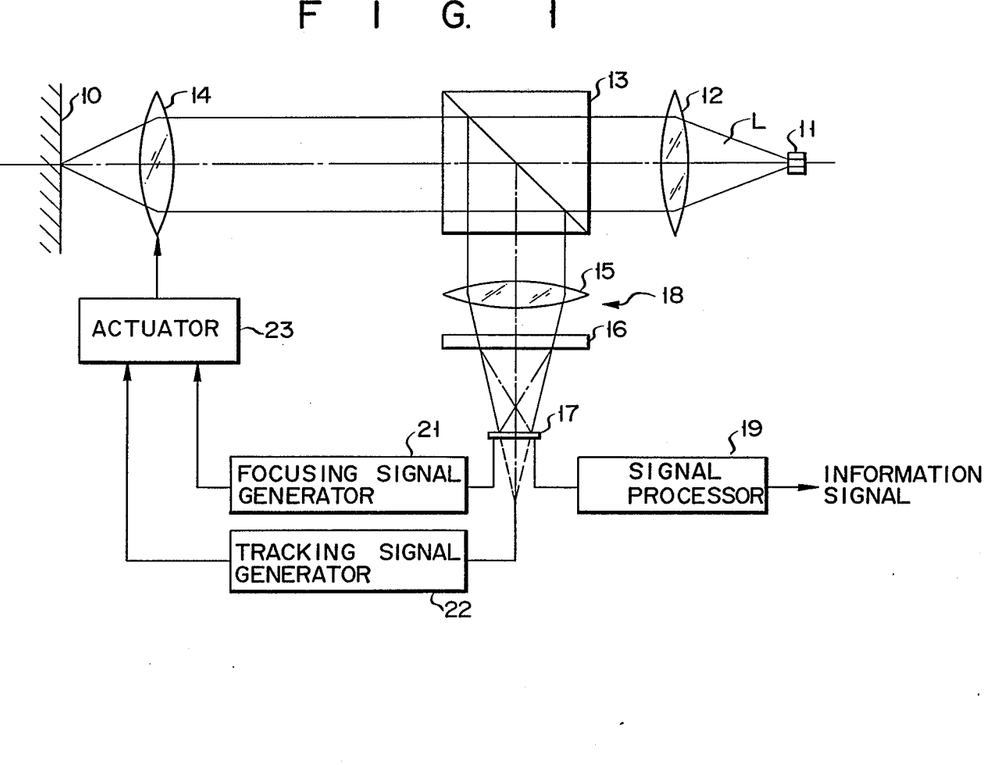
FIG. 1 is a block diagram schematically showing an optical system of an information recording/retrieving apparatus and focusing and tracking servo loops.

A system for detecting the position of an objective lens, according to the present invention, is applied to an information recording/retrieving apparatus, as shown in FIG. 1. In the system shown in FIG. 1, laser beam L, emitted and diverged from a semiconductor laser 11, is converted into a parallel beam by collimator lens 12, and transmitted through beam splitter 13 to objective lens 14. The parallel laser beam is converged by lens 14. Then, the converged laser beam is projected onto recording layer 10 of an information recording medium, such as a optical disk, in which information is recorded or to be recorded, in the form of pits or other recording domains, on tracking guides. In a retrieval mode, a predetermined laser beam is emitted from semiconductor laser 11, modulated optically in the domains, and radiated again toward lens 14. In a recording mode, a laser beam, modulated optically in accordance with the information to be recorded, is emitted from laser 11, and forms recording domains on the tracking guides. Then, the beam is radiated again toward lens 14. The radiated laser beam is converged by lens 14, reflected by beam splitter 13, and led into optical system 18 for detection. In the information recording/retrieving apparatus shown in FIG. 1, an astigmatic optical system, as disclosed in U.S. Pat. No. 4,023,033, is used for system 18. In this optical system, convergent lens 15 and cylindrical lens 16, for use as an astigmatic lens, are disposed on the optical axis of the laser beam reflected by splitter 13. After passing through lenses 15 and 16, the beam is applied to photodetector 17, having four photosensitive regions, and is converted into electrical signals. The signals are processed by signal processor 19, thus retrieving information signals, and are also supplied to focusing signal generator 21 and tracking signal generator 22. As a result, a focusing signal and a tracking signal are generated from generators 21 and 22, respectively. In response to the focusing and tracking signals, actuator 23 (mentioned later) is actuated, so that objective lens 14 is kept in a focusing state and directed toward a desired tracking guide.

A detecting optical system (not shown) based on the knife-edge method, can also be used to retrieve the information signals and produce the focusing and tracking signals. Examples of the knife-edge method are disclosed in U.S. Pat. Nos. 4,585,933, 4,521,680, and 4,564,460. Refer to these U.S. patents for further details of the optical systems, using the astigmatic method or knife-edge method.

Figure 2:
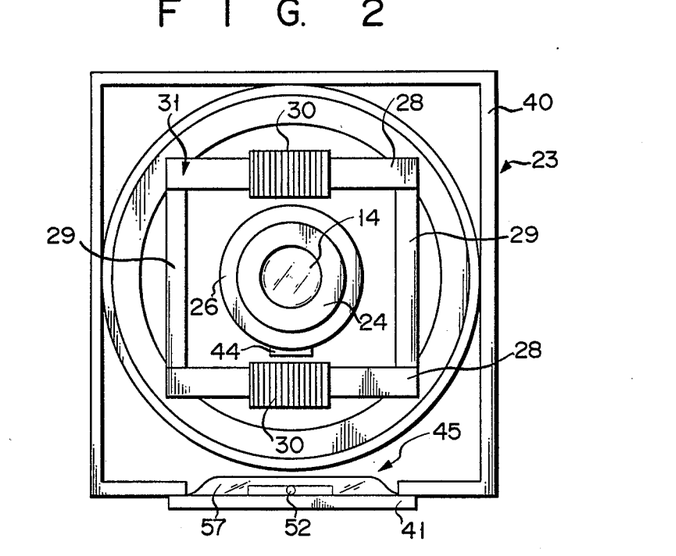
FIGS. 2 and 3 are a plan view and a sectional view, respectively, showing an arrangement of an actuator for driving an objective lens, incorporating a system for detecting the position of the objective lens, according to an embodiment of the present invention.
Figure 3:
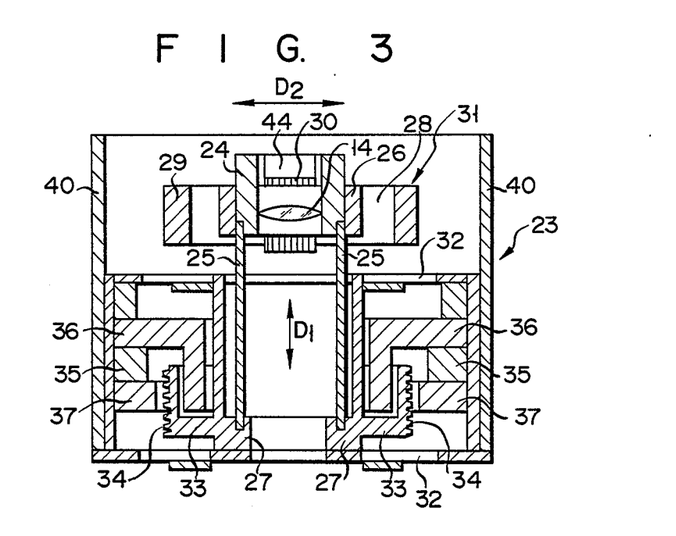

Actuator 23 of objective lens 14 is arranged as shown in FIGS. 2 and 3. Lens 14 is mounted in cylindrical holder frame 24, which is fixed to the free end of a pair of leaf springs 25. Springs 25 extend parallel to each other, from the base of cylindrical inner frame 27. Thus, lens 14 is held by springs 25 so that it can shift its position, at right angles to the extending direction of the tracking guide, as indicated by arrow D2. Movable magnetic member 26 is fixed to frame 24 so as to be movable together with frame 24. Member 26 is disposed in magnet unit 31, which is fixed to outer frame 40. Unit 31 is composed of a pair of yokes 28 and a pair of permanent magnets 29, coupled together so as to surround member 26, and coils 30 wound around yokes 28. When a predetermined current is supplied to coils 30, in response to the tracking signal, member 26 moves in the direction of arrow D2, and objective lens 14 is directed toward the specified tracking guide. Inner frame 27 is suspended by a pair of spiral springs 32. Springs 32 are supported by outer frame 40, in order to hold frame 27 so that frame 27, coupled to lens 14, can move in the direction of the optical axis of lens 14, as indicated by arrow D1. Also, frame 27 is coupled to cylindrical ring 33, which is wound with coil 34. Corresponding to coil 34, permanent magnet 35 and yokes 36 and 37 are fixed to frame 40. Yokes 36 and 37 extend into a space between frame 27 and ring 33. Thus, when current is supplied to coil 34, in response to the focusing signal, frame 27 moves in the direction of the optical axis of objective lens 14, as indicated by arrow D1, and lens 14 is kept in the focusing state.

Figure 4:
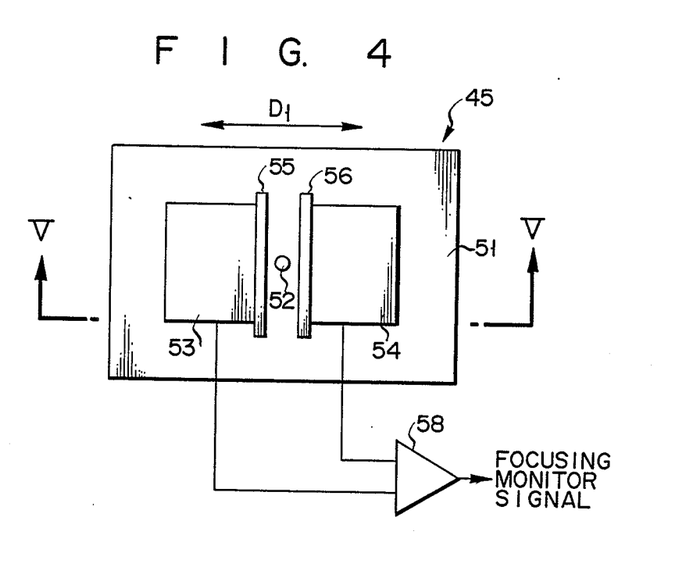
FIGS. 4 and 5 are a plan view and a sectional view, respectively, of a reflector-type coupler arrangement of the system shown in FIGS. 2 and 3.
Figure 5:
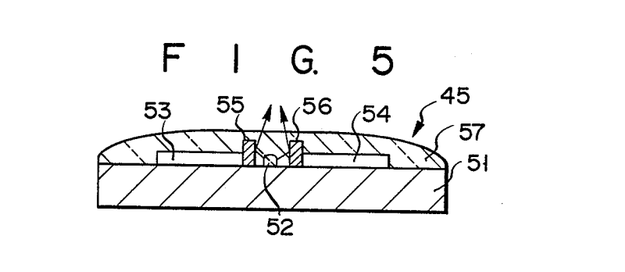

In focusing and tracking servo loops shown in FIG. 1, the laser beam reflected from recording film 10 of the optical disk is utilized for focus and track detection. Accordingly, if the optical disk has any scratches or dust thereon, or if it vibrates from any causes, error signals may possibly be generated from photodetector 17, thus moving the objective lens in an unexpected direction. According to the system of the present invention, however, actuator 23 is further provided with a detection system for monitoring at least the focusing servo loop, preferably for monitoring both the focusing and tracking servo loops. As shown in FIGS. 2 and 3, mirror 44 is provided on the outer surface of holder frame 24 for supporting objective lens 14, and coupler arrangement 45 of a reflector type is fixed to outer frame 40, so as to face mirror 44. Constructed as shown in FIGS. 4 and 5, arrangement 45 serves to detect the movement of lens 14 along its optical axis. In the coupler arrangement, light emitting element 52, such as a light emitting diode or laser diode, is fixed on base 51, which is formed of a glass plate coated with epoxy resin, as shown in FIGS. 4 and 5. A pair of photodetectors 53 and 54 are arranged individually on both sides of element 52, and are fixed to base 51 so as to be symmetrical with respect to element 52. Also, element 52 and photodetectors 53 and 54 are arranged along the optical axis of lens 14, that is, in the direction of arrow D1. Moreover, shading plates 55 and 56 are fixed to base 51, between element 52 and photodetectors 53 and 54. Transparent epoxy resin 57 is formed on base 51 so that element 52, photodetectors 53 and 54, and plates 55 and 56 are covered with resin 57. Mirror 44 and coupler arrangement 45 are arranged previously so that light rays, emitted from light emitting element 52 and reflected by mirror 44, are distributed equally to photodetectors 53 and 54, if objective lens 14 is in the focusing state, that is, if the focal point of lens 14 is located on record film 10. Shading plates 55 and 56 may be formed of insulating material, such as plastics, or of conductive material, such as stainless steel. If plates 55 and 56 are formed of conductive material, their surfaces are coated with insulating material, or insulating members are put on those surfaces of plates 55 and 56 which are in contact with base 51 and photodetectors 53 and 54. Preferably, the opposed faces of plates 55 and 56 are ground specularly so that the light rays from element 52 are prevented from scattering.

Figure 6:
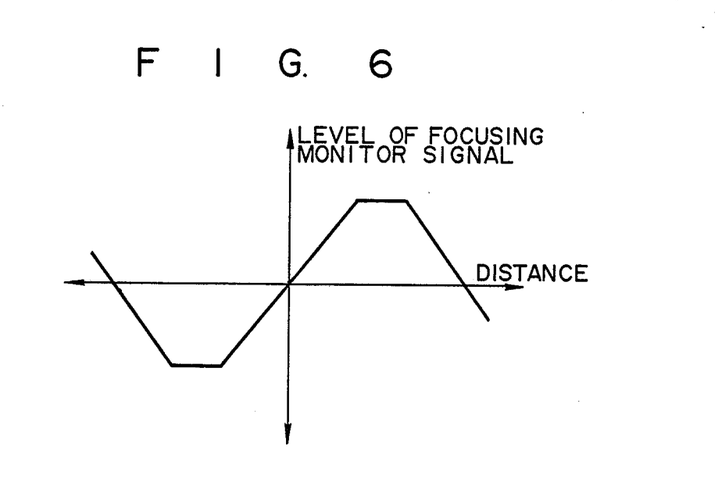
FIG. 6 is a graph showing the relationship between the position of the objective lens and the level of a focusing monitor signal, delivered from a differential amplifier connected to the coupler arrangement shown in FIG. 4.

In coupler arrangement 45, as shown in FIGS. 4 and 5, the light rays emitted from light emitting element 52 are delivered to mirror 44, directly or after being reflected by the opposed faces of shading plates 55 and 56. After they are reflected by mirror 44, the rays are returned to arrangement 45, and detected by photodetectors 53 and 54. When objective lens 14 is in the focusing state, the light rays detected by photodetectors 53 and 54 are equal in intensity. Accordingly, electrical signals of equal levels are delivered from photodetectors 53 and 54, and focusing monitor signals of a zero level, indicative of the focusing state, are generated from differential amplifier 58. If lens 14 is in a defocusing state such that its focal point is located outside recording film 10, the light rays detected by photodetectors 53 and 54 are different in intensity. As a result, electrical signals of different levels are delivered from photodetectors 53 and 54, and pulses indicative of the defocusing state, or focusing monitor signals of a minus level, as shown in FIG. 6, are generated from amplifier 58. In response to the focusing monitor signals, actuator 23 can be actuated directly, and lens 14 can be kept in the focusing state. While a focusing servo loop system is operating, a detection system for monitoring the focusing servo loop operates continually, thus keeping on delivering monitor signals to a monitor circuit (not shown). When the loop system operates in a wrong manner, however, it is connected to actuator 45 by the monitor circuit thereby actuating the actuator. When the loop system operates normally, it is disconnected from actuator 45, so that it is only monitored by the monitor circuit.

In coupler arrangement 45 shown in FIGS. 4 and 5, the light rays emitted from light emitting element 52 are prevented, by shading plates 55 and 56, from reaching photodetectors 53 and 54, directly or after being reflected by transparent epoxy resin 57, as a coating layer. Namely, the rays are reflected and directed toward the mirror, by the opposed faces of plates 55 and 56. As a result, photodetectors 53 and 54 are prevented from being hampered by noises. Thus, according to the system of the embodiment described above, the position of the objective lens can be detected with high sensitivity.

Figure 7:
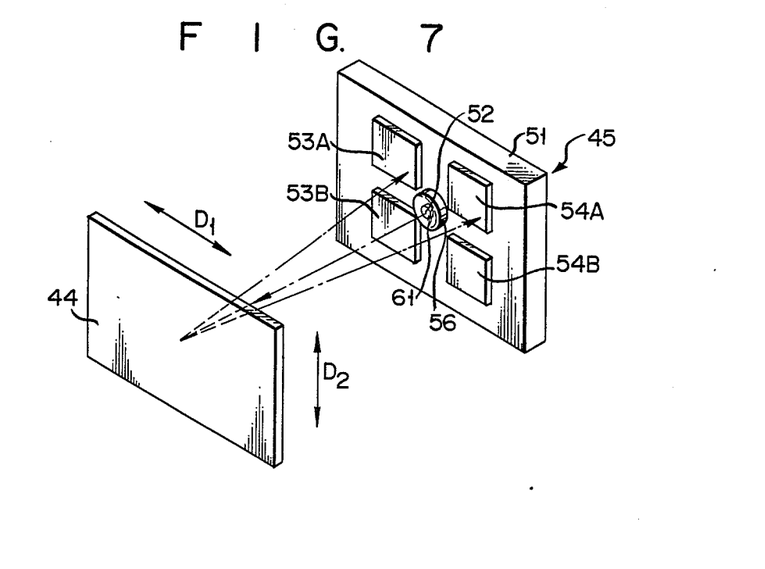
FIG. 7 is a perspective view of a reflector-type coupler arrangement of a system for detecting the position of an objective lens, according to another embodiment of the invention.
Figure 8:
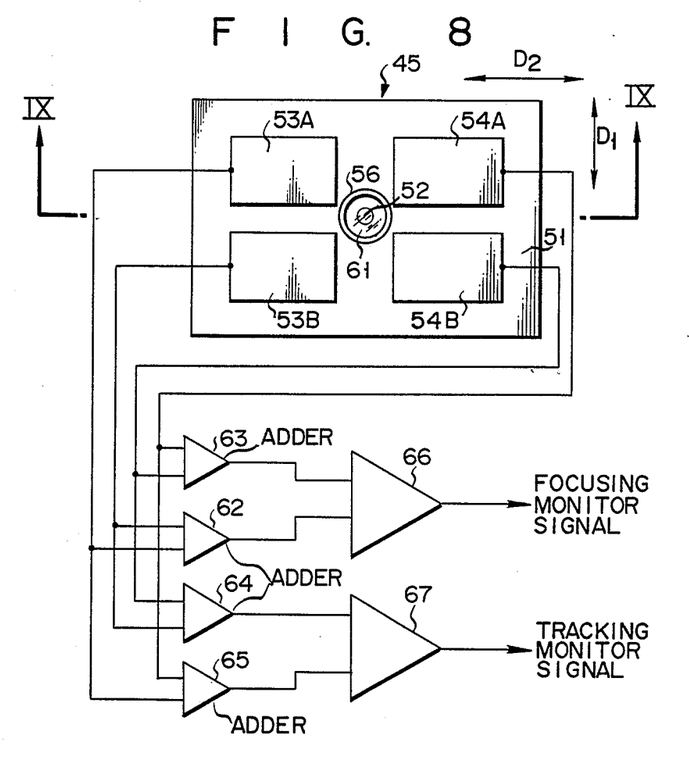
FIGS. 8 and 9 are a plan view and a sectional view, respectively, of the coupler arrangement shown in FIG. 7.
Figure 9:
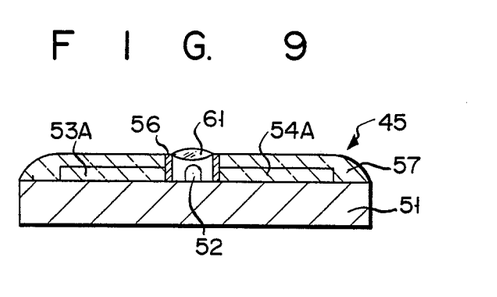

Referring now to FIGS. 7, 8 and 9, a detection system for both focusing and tracking servo loops will be described. In coupler arrangement 45, as shown in FIG. 7, first, second, third, and fourth photodetectors 53A, 53B, 54A and 54B are arranged on base 51, so as to be symmetrical with respect to light emitting element 52. Photodetectors 53A and 54A are arranged along the optical axis of objective lens 14 or in the direction of arrow D1. Likewise, photodetectors 53B and 54B are arranged along the optical axis of objective lens 14 or in the direction of arrow D1. Also, photodetectors 53A and 53B, as well as photodetectors 54A and 54B, are arranged in direction D2 perpendicular to the extending direction of the tracking guides. Mirror 44 and coupler arrangement 45 are arranged in the manner previously discussed in reference to FIGS. 4 and 5 so that light rays, emitted from light emitting element 52 and reflected by mirror 44, are distributed equally to photodetectors 53A and 54A and photodetectors 53B and 54B, if lens 14 is in the focusing state, that is, if the focal point of lens 14 is located on record film 10. If lens 14 is directed toward a specified tracking guide so that the guide is traced correctly by the converged laser beam, the light rays, emitted from element 52 and reflected by mirror 44, are distributed equally to photodetectors 53A and 53B and photodetectors 54A and 54B. In this second embodiment of the invention, moreover, a cylindrical member is used as shading plate 56, and convergent lens 61 is provided at an opening portion of the cylindrical member, as shown in FIG. 9, thus improving the directivity of the light rays led to mirror 44.

In coupler arrangement 45, as shown in FIGS. 8 and 9, the light rays emitted from light emitting element 52 are converged and efficiently directed toward mirror 44 by convergent lens 61, reflected to be returned to arrangement 45 by mirror 44, and then detected by photodetectors 53A, 54A, 53B and 54B. When lens 14 is in the focusing state, the light rays, detected by photodetectors 53A and 53B and photodetectors 54A and 54B, are equal in intensity. Accordingly, a summation output from adder 62, used to add electrical signals from photodetectors 53A and 53B, has the same level as a summation output from adder 63, used to add electrical signals from photodetectors 54A and 54B. Thereupon, differential amplifier 66 delivers focusing monitor signals of the zero level, indicative of the focusing state. If lens 14 is in the defocusing state so that its focal point is located outside recording film 10, the light rays, detected by photodetectors 53A and 53B and photodetectors 54A and 54B, are different in intensity. As a result, electrical signals of different levels are delivered from adders 62 and 63, and pulses indicative of the defocusing state, or focusing monitor signals of a minus level, are generated from amplifier 67. If lens 14 is directed toward a specified tracking guide, the light rays, detected by photodetectors 53A and 54A and photodetectors 53B and 54B, are equal in intensity. Accordingly, a summation output from adder 65, used to add electrical signals from photodetectors 53A and 54A, has the same level as a summation output from adder 64, used to add electrical signals from photodetectors 53B and 54B. Thereupon, differential amplifier 66 delivers tracking monitor signals of the zero level, which indicates that a correct tracking guide is traced by the converged laser beam. If lens 14 is not directed toward the specified tracking guide, the light rays, detected by photodetectors 53A and 54A and photodetectors 53B and 54B, are different in intensity. As a result, the summation output from adder 65, used to add the electrical signals from photodetectors 53A and 54A, is different in level from the summation output from adder 64, used to add the electrical signals from photodetectors 53B and 54B. Thereupon, differential amplifier 67 delivers pulses, which indicate that no correct tracking guide is traced by the converged laser beam, or tracking monitor signals of a minus level. In response to the focusing and tracking monitor signals, actuator 23 can be actuated directly, and objective lens 14 can be kept in the focusing state, and directed correctly toward the specified tracking guide. While a focusing and tracking servo loop system is operating, the detection system for monitoring the focusing and tracking servo loops operates continually, thus keeping on delivering monitor signals to the monitor circuit (not shown). When the loop system operates in a wrong manner, however, it is connected to actuator 45 by the monitor circuit, thereby actuating the actuator. When the loop system operates normally, it is disconnected from actuator 45, so that it is only monitored by the monitor circuit.

In coupler arrangement 45 shown in FIGS. 8 and 9, the light rays emitted from light emitting element 52 are directed efficiently toward the mirror, and the focus and track can be detected accurately.

Figure 10:
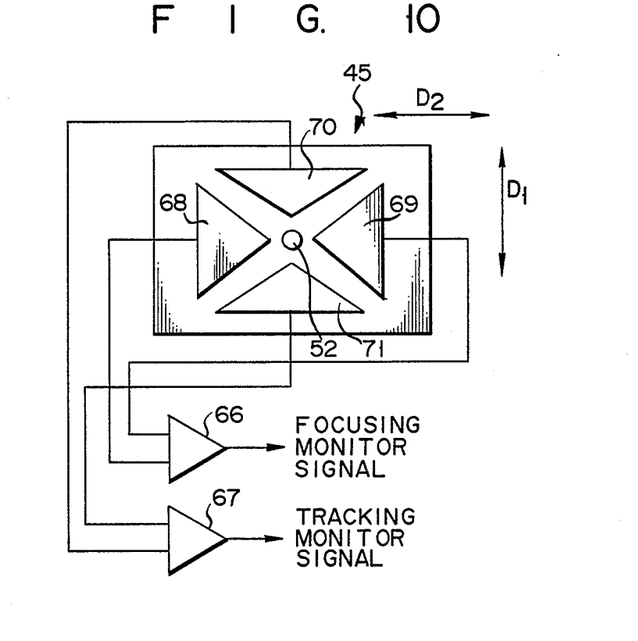
FIG. 10 is a plan view showing a modification of the coupler arrangement shown in FIG. 7.
Figure 11A:
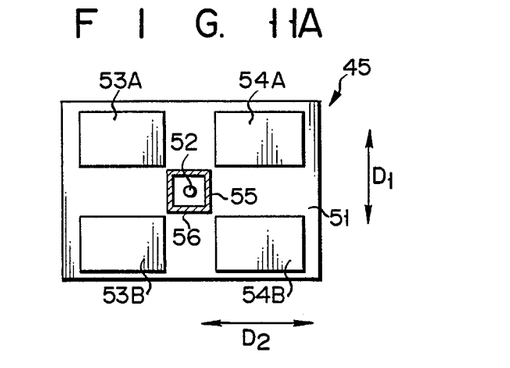
FIGS. 11A, 11B and 11C are plan views showing further modifications of the coupler arrangement shown in FIG. 7.
Figure 11B:
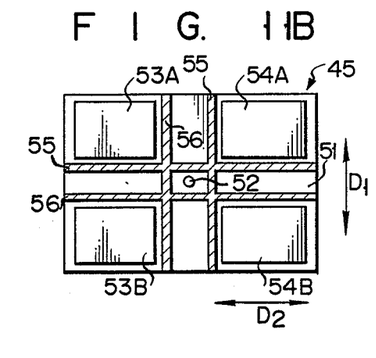
Figure 11C:
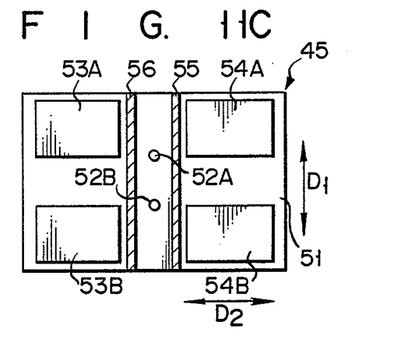

The arrangement of photodetectors 53A, 54A, 53B and 54B is not limited to the configurations shown in FIGS. 9 and 10. Alternatively, the photodetectors may be arranged as shown in FIG. 11A, 11B or 11C. In coupler arrangement 45, as shown in FIG. 10, first, second, third, and fourth photodetectors 68, 69, 70 and 71 are arranged on base 51, so as to be symmetrical with respect to light emitting element 52. Photodetectors 68 and 69 are arranged along the optical axis of objective lens 14 or in the direction of arrow D1, while photodetectors 70 and 71 are arranged in the direction of arrow D2. Also, photodetectors 68 and 69 are connected to differential amplifier 66, which produces focusing monitor signals, while photodetectors 70 and 71 are connected to differential amplifier 67, which produces tracking monitor signals.

Also in coupler arrangement 45 shown in FIG. 10, the focus and track can be detected accurately.

The arrangement of shading plate 56 is not limited to the embodiments described above, and the shading plate may be arranged in various configurations, as shown in FIGS. 11A, 11B and 11C. In the description of modifications shown in FIGS. 11A to 11C, like reference numerals are used to designate like portions as shown in FIGS. 1 to 10, for simplicity of illustration.

Figure 11D:
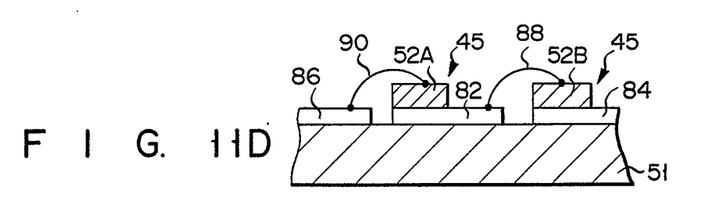
FIG. 11D is a sectional view of the coupler arrangement shown in FIG. 11C.
Figure 11E:
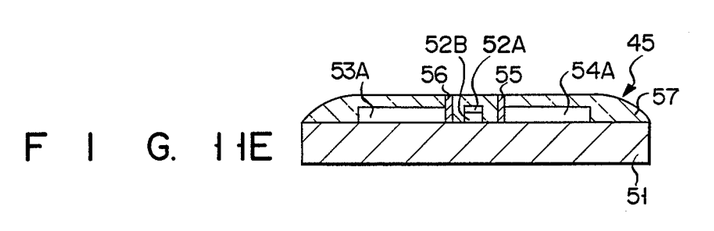
FIG. 11E is a sectional view showing another modification of the coupler arrangement shown in FIG. 7.

In the above described embodiments, if the intensity of light rays, emitted from the light emitting element, especially from light emitting diode 52, is not sufficient, two or more light emitting elements 52A and 52B may be provided on base 51, as shown in FIG. 11C. In coupler arrangement 45, with elements 52A and 52B on base 51, elements 52A and 52B are preferably connected in series with each other, in order to suppress current supplied to elements 52A and 52B, and to obtain sufficient luminous intensity. In the arrangement of FIG. 11C, elements 52A and 52B are mounted on conductive patterns 82 and 84, respectively, on base 51, as shown in FIG. 11D. The respective cathodes of elements 52A and 52B are connected to their corresponding patterns 82 and 84, while the anodes of elements 52A and 52B are connected to conductive patterns 82 and 86, by means of bonding wires 88 and 90, respectively. Thus, elements 52A and 52B are connected in series with each other. The coupler arrangement, with series-connected elements 52A and 52B, is not limited to the configurations shown in FIGS. 11C and 11D, and may alternatively be constructed so that light emitting elements 52A and 52B are stacked in layers, as shown in FIG. 11E.

In the system according to the invention, the coupler arrangement shown in FIG. 4 may be used for detecting a deviation of the objective lens 14 along the direction $D_2$ to direct the objective lens 14 toward the specified tracking guide. In the coupler arrangement, the light emitting element 52 and photodetectors 53, 54 are arranged along the direction $D_2$ so that only the tracking monitor signal is supplied from differential amplifier 58, in stead of the focusing monitor signal.

Thus, according to the system of the present invention, the focus and track detection system, utilizing the light beam transmitted through the objective lens, can securely prevent the photodetector, for focus and track detection, from generating error signals, which may cause the lens to move in an unexpected direction, if the optical disk has any scratches or dust thereon, or if it vibrates from any causes. Since the focus and track can be detected with high accuracy, moreover, the objective lens can be located securely and quickly, in a predetermined position.

What is claimed is:

1. An apparatus for controlling the state of focus of a light beam on an information recording medium, comprising:
   first generating means for generating a first light beam;
   lens means, having an optical axis, for converging the first light beam to form a beam spot on the information recording medium, a minimum beam spot being formed on the information recording medium when the lens means is in a focused state and a beam spot larger than the minimum beam spot formed on the information recording medium when the lens means is in a defocused state;
   means for converting the first light beam transferred from the recording medium into a focus signal representing a focus state of the lens means;
   means for movably suspending the lens means, the lens means being movable along the optical axis;
   a plane mirror in fixed spaced relation with the lens means and movable with the lens means;
   second generating means facing the plane mirror for generating a divergent light beam;
   first and second photodetector means for detecting the light rays reflected from the plane mirror, and converting the light rays into electric signals, said first and second photodetector means being arranged along the optical axis and at respective sides of the light emitting means, said plane mirror being disposed facing said first and second photodetector means and substantially parallel thereto and the light rays detected by the photodetector means being varied in accordance with the movement of the plane mirror so that the levels of the electric signals are changed in response to the movement of the plane mirror;
   means for converting the electric signals generated from the photodetector means into a positional signal corresponding to the position of the lens means; and
   means for driving the lens means along the optical axis in response to the focusing signal and the positional signal to maintain the lens means in the focused state.

2. An apparatus for controlling the status of tracking of a light beam on an information recording medium having a tracking guide, comprising:
   first generating means for generating a first light beam;
   lens means, having an optical axis, for converging the first light beam onto the information recording medium;
   means for converting the first light beam emanating from the information recording medium into a tracking signal representing a tracking state of the lens means;
   means for movably suspending the lens means, the lens means being movable along a predetermined direction substantially perpendicular to the optical axis;
   a plane mirror movable with the lens means;
   second generating means facing the plane mirror for generating a divergent light beam;
   first and second photodetector means for detecting the light rays reflected from the plane mirror, and converting the light rays into electric signals, said photodetector means being arranged along the predetermined direction, located at respective sides of the light emitting means, said plane mirror being disposed facing said first and second photodetector means and substantially parallel thereto and the light rays detected by the photodetector means being varied in accordance with the movement of the plane mirror, the levels of the electric signals being representative of the movement of the plane mirror;
   means for converting the electric signals generated from the photodetector means into a positional signal corresponding to the position of the lens means;
   means for driving the lens means along the predetermined direction in response to the tracking signal and the positional signal to direct the light beam emergent from said lens means onto the tracking guide so that the tracking guide is traced by the light beam.

3. An apparatus for controlling the status of focus and tracking of a light beam on an information recording medium having a tracking guide, comprising:
   first generating means for generating a first light beam;
   lens means, having an optical axis, for converging the first light beam to form a beam spot on the information recording medium, a minimum beam spot being formed on the information recording medium when the lens means is in a focused state and a beam spot larger than the minimum beam spot being formed on the information recording medium when the lens means is in a defocused state;

means for converting the first light beam emanating from the recording medium into a focusing signal representing a focusing state of the objective lens;

means for movably suspending the lens means, the lens being movable along the optical axis and in a predetermined direction perpendicular to the optical axis;

a plane mirror movable with the lens means;

second generating means facing the plane mirror for generating a divergent light beam;

first and second photodetector means for detecting the light rays reflected from the plane mirror and converting the light rays into electric signals, said first and second photodetector means being arranged along the predetermined direction and located at respective sides of the light emitting means, said plane mirror facing said first and second photodetector means and being disposed substantially parallel thereto and the light rays detected by the photodetector means being varied in accordance with the movement of the plane mirror so that the levels of the electric signals are changed in response to the movement of the plane mirror;

means for converting the electric signals generated from the photodetector means into a positional signal corresponding to the position of the lens means;

means for driving the lens means along the optical axis in response to the focusing signal to maintain the lens means in a focused state and along the predetermined direction in response to the positional signal to direct the light beam emerged from the lens means onto the tracking guide so that the tracking guide is traced by the light beam.

4. The system according to claims 1, 2, or 3, further comprising a first differential amplifier connected to the first and second photodetector means to produce a first monitor signal corresponding to the difference between the electrical signals delivered from the first and second photodetector means.

5. The system according to claims 1, 2, or 3, further comprising transparent cover means covering the second generating means and the first and second photodetector means.

6. The system according to claims 1, 2, or 3, further comprising converging means disposed between the second generating means and the mirror, and adapted to converge the light rays emitted from the second generating means.

7. The system according to claim 1, 2, or 3, further comprising shading means disposed between the first and second photodetector means and the second generating means to prevent the light rays, emitted from the second generating means, from directly reaching the first and second photodetector means.

8. The system according to claim 1 further comprising third and fourth photodetector means for detecting the light rays reflected by the mirror, and converting the rays into electrical signals, said third and fourth photodetector means being arranged a predetermined direction substantially perpendicular to the optical axis, so that the first, second, third, and fourth photodetector means are arranged substantially symmetrically with respect to the second generating means.

9. The system according to claim 8, further comprising shading means disposed between the first, second, third, and fourth photodetector means and second generating means to prevent the light rays, emitted from the second generating means, from directly reaching the first, second, third, and fourth photodetector means.

10. The system according to claim 8, further comprising a second differential amplifier connected with the third and fourth photodetector means to produce a second monitor signal corresponding to the difference between the electrical signals delivered from the third and fourth photodetector means.

11. The system according to claims 2 or 3, further comprising third and fourth photodetector means for detecting the light rays reflected by the mirror, and converting the rays into electrical signals, said third and fourth photodetector means being arranged along the optical axis, the first and third photodetector means being arranged in the predetermined direction substantially perpendicular to the optical axis, and the second and fourth photodetector means being arranged also in the predetermined direction substantially perpendicular to the optical axis.

12. The system according to claim 11, further comprising shading means disposed between the photodetector means and second generating means to prevent the light rays emitted from the second generating means from directly reaching the photodetector means.

13. The system according to claim 11, further comprising a first adder for adding the electrical signals from the first and third photodetector means and producing a first summation signal; a second adder for adding the electrical signals from the second and fourth photodetector means, and producing a second summation signal; a first differential amplifier connected to the first and second adders to produce a first monitor signal corresponding to the difference between the first and second summation signals; a third adder for adding the electrical signals from the first and second photodetector means, and producing a third summation signal; a fourth adder for adding the electrical signals from the third and fourth photodetector means, and producing a fourth summation signal; and a second differential amplifier connected to the third and fourth adders to produce a second monitor signal, equivalent to the difference between the third and fourth summation signals.

14. The system according to claims 1, 2, and 3, wherein said second generating means includes a pair of light emitting diodes connected in series with each other.

* * * * *